United States Patent [19]
Weigelt

[11] Patent Number: 5,355,046
[45] Date of Patent: Oct. 11, 1994

[54] STATOR END-WINDING SYSTEM AND A RETROFITTING SET FOR SAME

[76] Inventor: Klaus Weigelt, Postfach 1132, 7897 Kadelburg, Fed. Rep. of Germany

[21] Appl. No.: 874,601

[22] Filed: Apr. 27, 1992

Related U.S. Application Data

[63] Continuation-in-part of Ser. No. 627,001, Dec. 13, 1990, Pat. No. 5,140,740.

[30] Foreign Application Priority Data

Dec. 15, 1989 [CH] Switzerland ............ 4515/89-0

[51] Int. Cl.⁵ .................................. H02K 3/46
[52] U.S. Cl. .............................. 310/260; 310/42; 310/271
[58] Field of Search .............. 310/260, 271, 42, 43, 310/45, 254, 270, 179, 64, 214; 336/197

[56] References Cited

U.S. PATENT DOCUMENTS

| Re. 28,478 | 7/1975 | Bahn | 310/260 |
|---|---|---|---|
| 3,991,334 | 11/1976 | Cooper | 310/260 |
| 4,126,799 | 11/1978 | Iogansen | 310/260 |
| 4,379,243 | 4/1983 | Dailey | 310/260 |
| 4,488,079 | 12/1984 | Dailey | 310/260 |
| 4,525,642 | 6/1985 | Humphries | 310/260 |
| 4,563,607 | 1/1986 | Cooper | 310/260 |
| 4,618,795 | 10/1986 | Cooper | 310/260 |
| 4,808,873 | 2/1989 | Rowe | 310/260 |
| 4,943,749 | 7/1990 | Ponce | 310/260 |
| 5,051,642 | 9/1991 | Hediger | 310/260 |

FOREIGN PATENT DOCUMENTS

| 0309096 | 3/1989 | European Pat. Off. |  |
| 1286198 | 1/1969 | Fed. Rep. of Germany | 310/260 |
| 1463796 | 3/1969 | Fed. Rep. of Germany | 310/260 |
| 0134707 | 3/1979 | Fed. Rep. of Germany | 310/260 |
| 0634695 | 2/1983 | Switzerland . |  |

*Primary Examiner*—R. Skudy
*Attorney, Agent, or Firm*—Louis Weinstein

[57] ABSTRACT

A stator end-winding system is proposed in which the bars of the winding are bent outwards and describe a hollow cone. The supporting proceeds by a wedge-like braced inside ring, a segmented outside ring and supports which also have a wedging effect. The bracing of the inside ring and outside ring is made by tie rods, the outside ring is azimuthally tensionable. Therefore, it can be placed over mentioned cone described by the bars without the necessity of disassembling the stator end-winding system.

21 Claims, 3 Drawing Sheets

STATOR END-WINDING SYSTEM AND A RETROFITTING SET FOR SAME

This application is a continuation-in-part of application Ser. No. 627,001, filed Dec. 13, 1990 now U.S. Pat. No. 5,140,740.

BACKGROUND OF THE INVENTION

1. Field of the Invention

The present invention relates to a stator end-winding system of the stator of an electric machine having an array of bars expanding coaxially to the axis of the machine at its end areas in the shape of a hollow cone, and having a means for supporting same including an inside-ring which extends cone-like along a substantial axial portion of the cone-shaped array of bars. It relates also to a retrofitting set for a stator end-winding support system of an electric machine having an array of bars expanding outward coaxially to the axis of the machine at its end areas in the shape of a hollow cone. It relates further to a stator end-winding system of an electric machine having an array of bars expanding outward coaxially to the axis of the machine at its end areas in the shape of a hollow cone, and a support system for same which includes supporting members located at the inside and outside relative to the cone-shaped array of bars and which may be retrofitted to an existing machine without removing or disassembling the stator bars.

The high dynamic forces acting during the operation at locations of resonance of the mechanical stator end-winding system of stator end-windings and the problems resulting therefrom, specifically in the case of large electrical machines, specifically of turbogenerators with a directly hydrogen-cooled stator winding, are generally known. The appearance of exciting forces of specific frequencies cannot be influenced at a given operation wherewith it is endeavored to move the locations of resonance of the mechanical stator impedance as much as possible away from the exciting frequencies occurring during the operation. In operation, operational vibrations, specifically in the case of resonance, lead to high dynamic stresses of the end-windings, specifically in the case of turbogenerators, which may lead to a loosening of the entire stator winding assembly. Abrasions of insulation and damage at the stator and the results thereof lead in turn to long shut-down times for repair of the stators. Due to the known direct hydrogen cooling of the stator winding of generators, the number of slots of the stators is kept as low as possible resulting in large dimensions of the bars of the stator and accordingly in large masses. Because the dynamic forces are proportional to the masses acted upon, aside from the acceleration of the vibrations, accordingly high stresses are the result, specifically of the end-winding assembly. Accordingly, there exists on the one hand the problem in the case of the known stator end-winding systems of being able to absorb the large dynamic forces. On the other hand, such stator end-winding systems, also if they have been improved regarding dynamic stresses, must be subjected from time to time to maintenance work whereby the generally complicated and, regarding the maintenance, difficult structural designs of stator end-winding systems lead to corresponding shut-down times. A repair of most of the known stator end-windings means a new winding of the stator.

2. Description of the Prior Art

U.S. Pat. No. 4,488,079 discloses a stator end-winding system, specifically of a turbogenerator, including an array of bars expanding outward coaxially to the axis of the machine at its end areas in the shape of a hollow cone and a supporting system for same. The supporting system includes a plurality of rings located inside of the hollow cone formed by the array of bars, and at the outside a massive conically extending outside ring. The bars of the winding are braced therebetween by means of its rods and intermediate rings. The outer massive ring is, furthermore, axially anchored at the stator body. Due to the generally used cone-shaped array of the bars which expand axially towards the outside, it is not possible to revise or repair, respectively, the stator end-winding support system without a dismounting of the bars which necessitates a new winding of the stator. Furthermore, a plurality of weakly dimensioned inside rings lead to a merely low stiffness or rigidity, respectively of the stator end-winding unit because the bracing forces act more or less only along straight lines and do not act uniformly at the cone of the stator bars.

U.S. Pat. No. 4,525,642 also discloses a stator end-winding with an array of bars expanding conically outward and an anchoring between the body of the stator and the outer support of the bars at the stator end-winding in order to absorb thermally caused expansions between the arrangement of bars and the body of the stator.

U.S. Pat. No. 4,563,607 also discloses a stator end-winding with an array of bars expanding outward coaxially to the axis of the machine at its end areas in the shape of a hollow cone and a support for same as well, which support, located at the inside, includes clamps extending under the bars and holding same and being radially braced to upper plates which are anchored at the body of the stator and are substantially axially aligned. The plates and the clamps are braced together by means of bracing rings located between the bars of the bar array. The support is mounted to the stator body. The small masses of the inner and outer members used here for the support and braced against each other have a negative effect upon the damping of the resonance behavior of the stator end-winding such that, together with the line-contact bracing, only an insufficient rigidity of the stator end-winding is achieved.

U.S. Pat. No. 4,808,873 discloses basically to insert a suitable padding material between the bars of the array of bars.

European Patent EP-A-0 309 096 discloses further to foresee an outer support in the form of an outer ring at a stator end-winding also having an array of bars expanding in the form of a hollow cone in order to embrace the bars by tensioning bands extending from said outer rings. Again, due to the small installed supporting masses and line-contact-like bracings, the resonance behavior of this stator end-winding is unsatisfactory due to the lack of rigidity. Additionally, due to the fact that the ring is displaced axially inward from the largest outer diameter of the cone-shaped arrangement of bars, a revision of the stator end-winding is not possible, but rather only a disassembly along with at least a partial removal of the bars.

Swiss Patent 634,695 discloses a stator end-winding of an electric machine having an array of bars expanding outward coaxially to the axis of the machine at its end areas in the shape of a hollow cone, whereby a support is provided which includes an inside ring which extends cone-like along substantial axial portion of the cone-shaped array of bars, and includes an outside ring system at the end of the arrangement of bars which is radially braced onto the inside ring by means of tie rods via the array of bars. In order to make the maintenance activity of the stator end-winding easier in spite of the foreseen outside ring, i.e., to remove the inside ring and outer ring without having to disassemble the array of bars itself, the outside ring is located directly in the area of a bracket portion interconnecting the inner and outer bars, which bracket portion defines at the end area of the cone substantially a cylindrical surface such that, after the unscrewing of the tie-rods, the outside ring located at the end area can be pulled off. The outside ring and the inside ring as well are, however, additionally locked axially such that a disassembling remains relatively cumbersome. In order to benefit by a simpler disassembling procedure after all the relatively weakly dimensioned outside ring is arranged in such a manner at the cylindrical end area portion of the arrangement of bars, that the radial bracing with the inside ring proceeds only at the end area of the bars, the axially much longer cone-shaped portion of the array of the bars is not braced further up to the body of the stator or core, respectively. The result thereof is an only limited rigidity of the stator end-winding system in spite of the massive inside ring.

SUMMARY OF THE INVENTION

It is an object of the present invention to provide a stator end-winding system of the kind mentioned above which is less prone to vibrations or oscillations, respectively, i.e., to design it more rigid.

A further object is to provide a stator end-winding system in which the inside-ring is braced axially into the array of bars which expands in the shape of a hollow cone.

A further object is to provide a rigid interconnection for inside ring/outside support elements by bracing the inside ring wedge-like axially in the hollow cone described by the bars. Accordingly, an as high as possible rigidity of the stator end-winding system shall be arrived at in order to raise the resonance frequencies of this system above exciting frequencies occurring during the operation of the electrical machine at base frequencies of 50 or 60 Hz usually predominantly at their first harmonic frequencies, namely 100 and 120 Hz., respectively.

Still a further object is to provide a stator end-winding system which is easy to disassemble and to assemble without having to remove the bars of the winding in that an outer support system is provided which includes at least one segmented ring or supporting bars extending substantially in the azimuthal direction.

Yet a further object is to provide a stator end-winding in which an outer support system includes an outside ring system in the region of the outer side of the array of bars which converges cone-like inward such as to arrive at a bracing of the array of bars along the plane of the cone formed by the bars over a large surface or plane respectively by means of which the rigidity of the stator end-winding system is increased considerably, and in which at least a portion of the outer ring system is, furthermore, azimuthally and/or radially tensionable such that it nevertheless can slide in its entirety over the end area of the array of bars having the largest diameter without disassembling the stator-end winding or disassembled therefrom and thereafter be fixedly braced at an area of the reduced cone diameter, by a radial pull and/or azimuthal tensioning.

A further object is to provide a stator end-winding wherein the inside ring acts upon the array of bars in a wedge-like fashion and is axially braced by tie-rods extending oblique-angled inclined and axially inward relative to its cone surface such that the axially acting tension also exerted by the tie-rods will brace the inside ring axially against the stator body. The wedge action shall be, thereby, adjustable by an increase or decrease, respectively, of the tension of the tie-rods and accordingly the rigidity of the stator end-winding system.

Yet a further object is to provide a stator end-winding comprising an outside-ring system which acts via a conical tension surface arrangement upon the outer side of the cone-shaped array of bars and acts in a wedge-like fashion upon the array of bars by means of tie-rods inclined axially oblique-angled and outward relative to the tension surface, such that the wedge principle at the cone-shaped array of bars is consequently made use of for the outer ring system in that it acts via a conical bracing surface system upon the outer side of the conical array of bars and acts wedge-like upon the array of bars by tie-rods which are axially inclined outward relative to the above-mentioned surface.

A further object is to provide a stator end-winding system which is optimally rigid by means of two wedge arrangements, namely an inside wedge formed by an inside ring and an outside wedge formed by an outside ring system which wedges are braced (i.e.,urged) by means of the tie rods against each other.

Yet a further object is to provide a stator end-winding system in which the inner ring is held substantially only by means of tie-rods, apart from an axial locking relative to the winding such as, e.g., is achieved by means of a cord. Bearing in mind that either an outer support or the inside ring system is to be axially anchored at the body of the stator, it becomes obvious that due to the accessibility this must be realized at the outside ring support and thus the inside ring is mounted such as set forth above.

Still a further object is to provide a stator-end winding system including an outer support system which has at least one tensionable outside ring which is substantially held only by means of tie-rods such that the tensioning of the outer ring system can be made independently from the axial anchoring of the outer ring system.

Yet a further object is to provide a stator end-winding system which comprises an outer support system which includes at least one outside ring having two or, preferably three or more azimuthally and/or radially braceable ring segments which may be detached from each other, such that the outside ring can be in the form of segments which are separated from each other over the outer cone of the array of bars and thereafter the segments can be connected to each other and finally be azimuthally tightened around the stator bar cone. Alternatively thereto, the segments may be tightened only radially inward. The tightening of the segments proceeds preferably by an azimuthal screwing and/or by radial anchors.

A further object is to provide a stator end-winding system including a support in form of a hollow cone having substantially an axial extent corresponding to the axial extent of the cone-shaped array of bars, via which outer support system as the outer ring system rests on the outer surface of cone-shaped array of bars, such that a uniform bracing of the array of bars is produced over large areas of the cone surface: The support distributes the forces, e.g., generated by the tie-rods uniformly over the above-mentioned cone surface. It is thereby preferred to insert one or more preferably padded rings between the support and the bars of the winding located adjacent of same.

Still a further object is to provide a stator end-winding system in which an outer ring system is anchored preferably via rigid connectors and/or connectors having spring members and/or guide members to the body and/or frame of the stator such that either within the scope of the elasticity of the material of the rigid connectors which are designed accordingly or within the scope of the spring action of the spring members or slidable, an axial, thermally caused shifting between the bars and the body of the stator is made possible without producing stresses thereon which are too high.

Yet a further object is to provide a stator end-winding system in which the bars, the inside ring, and an outer support of the stator end-winding system are at least partially mutually cast in and/or padded and/or provided with cords and braced together.

A further object is to provide a stator end-winding system having a basic design which allows an easy disassembling of the end-winding system in order to be mounted upon maintenance and repair work at known existing stator end-windings having an array of bars which expand at the end areas coaxially to the axis of the machine outward.

Thus, a further object is to thereto provide a retrofitting set for such a stator end-winding system which includes an axially braceable inside-ring having a conical outer surface and corresponding to at least a substantial portion of the inner cone formed by the above-mentioned array of bars.

A further object is to provide for such retrofitting set at the outside conical surface an axially braceable ring and possibly an azimuthally and/or radially braceable outer support to allow a repair of a stator end-winding system rapidly and without long down-times, with further help of further known structural members such as tie-rods, intermediate bracing rings, material for a casting-in, for padding and applying of cords, etc.

Still a further object is to provide a method of retrofitting a stator end-winding system of a known or of the inventive design wherein the originally foreseen existing support system for the bars of the stator is at least partially removed, at least one inside ring which has a conical-shaped outer surface conforming to at least a substantial portion of the inner cone of the array of bars is inserted into the array of bars and braced axially. Preferably, an azimuthally and/or radially tensionable outer support system is placed over the outer surface of the array of bars and is further preferably braced via tie-rods to the inside ring and is itself braced azimuthally and/or radially.

A further object is to provide a retrofitting assembly in which rigid connectors and/or connectors with spring members or slidable connectors for an outer support system, preferably an outer ring system is mounted to the stator body and/or stator frame which latter allows an axial displacement between the stator body and the outer support system, may such be within the scope of the elasticity of the material, of the rigid connectors or within the scope of the spring properties or then slidable.

A further object is to provide a method wherein an outer support system is provided which is mounted in a padded fashion to the array of bars and where preferably the interstices between the upper and lower bars are at lest partly padded and the bars are preferably additionally supported by filler materials and or cords.

Still a further object is to provide a support system of the type described and wherein pads and/or a filler material are built in at the stator-end winding and are impregnated with resin prior to the bracing of at least the inside ring and wherein preferably an outer support system preferably in the form of an outer ring system and secured by cords is provided.

Yet a further object is to provide a retrofitting assembly for a stator end-winding wherein the retrofitting assembly and preferably also thereafter the state of the stator end-winding system is controlled regarding its resonance behavior by means of a modal analysis and having adjustable tensioning means to adjust the resonance behavior of the system.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENTS

Figure 1:
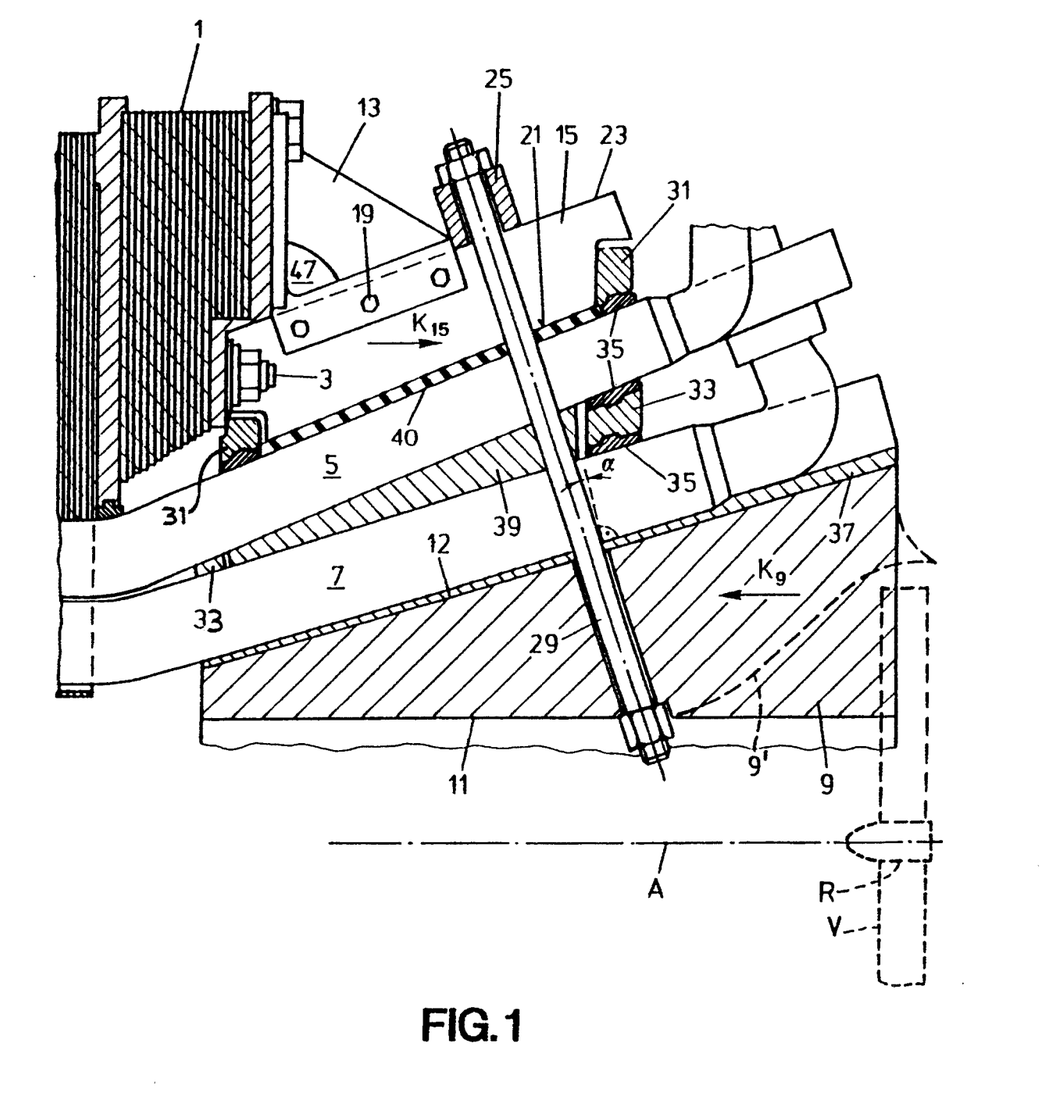
FIG. 1 is a radial section through a stator end-winding system in accordance with the present invention.

The portion of a stator illustrated in FIG. 1, for instance a stator of a turbogenerator includes, according to known designs, a stator core 1 bolted by through-bolts 3 extending coaxially to the schematically designated machine axis A. The outer bars 5 of the winding and the inner bars 7, respectively thereof are located in the stator core 1.

These bars project at the front end of the stator core 1 and are bent outwardly in radial planes extending through the machine axis A such that they form in their entirety an array of bars having the form of a hollow cone around the machine axis A. According to the present invention an inside ring 9 is provided which includes a cylindrical inner surface 11 and a conical outer surface 12. The conical outer surface 12 defines relative to the machine axis A at least approximately the same cone angle as the cone angle which inner bars 7 define relative to this axis A. The conical outer surface 12 of the inside ring 9 includes preferably no radial recesses or projections except possibly a grooving or similar means for holding a filler material. The inside ring 9 can be slidingly inserted in a wedge-like manner into the open cone-shaped region formed by the inner bars 7 and be axially braced therein. The inside ring 9 is preferably made of an electrically non-conductive or at least poorly conductive material such as of a glass-fibre reinforced plastic material. Further, the inside ring 9 may be formed as one piece or may be composed of a plurality of assembled pieces.

The illustration in broken lines in FIG. 1 indicates that possibly a ventilator V may be arranged on the shaft of the rotor R adjacent the stator end-winding; in such case, the end portion of the inside ring 9 may be designed as having a gas guiding arrangement 9' for the flow of a cooling gas, such as, e.g., forming the outer casing of the ventilator.

Bracket plates 15 located outside of the cone-shaped surface defined by the outer bars 5 are anchored by means of screw bolts to the stator core 1 via angle members 13. The bracket plates 15 themselves are bolted to the angle members 13 by means of screw bolts 19 which extend through openings 20 in angle members 13. The bracket plates 15 cover one or more bars 5, 7 of the winding seen in the axial and azimuthal direction and describe, relative to the outer bars 5 by means of their inner surfaces 21, a cone-shaped surface which extends substantially parallel to the cone-shaped surface defined by the outer bars 5. The cone angle defined by the surfaces 21 is possibly smaller than the cone angle defined by the outer bars 5. An outside ring 25, which in its assembled state is a continuous embracing ring, rides on the radially outer supporting surfaces 23 of the bracket plates 15.

Figures 2A, 2B, 3:
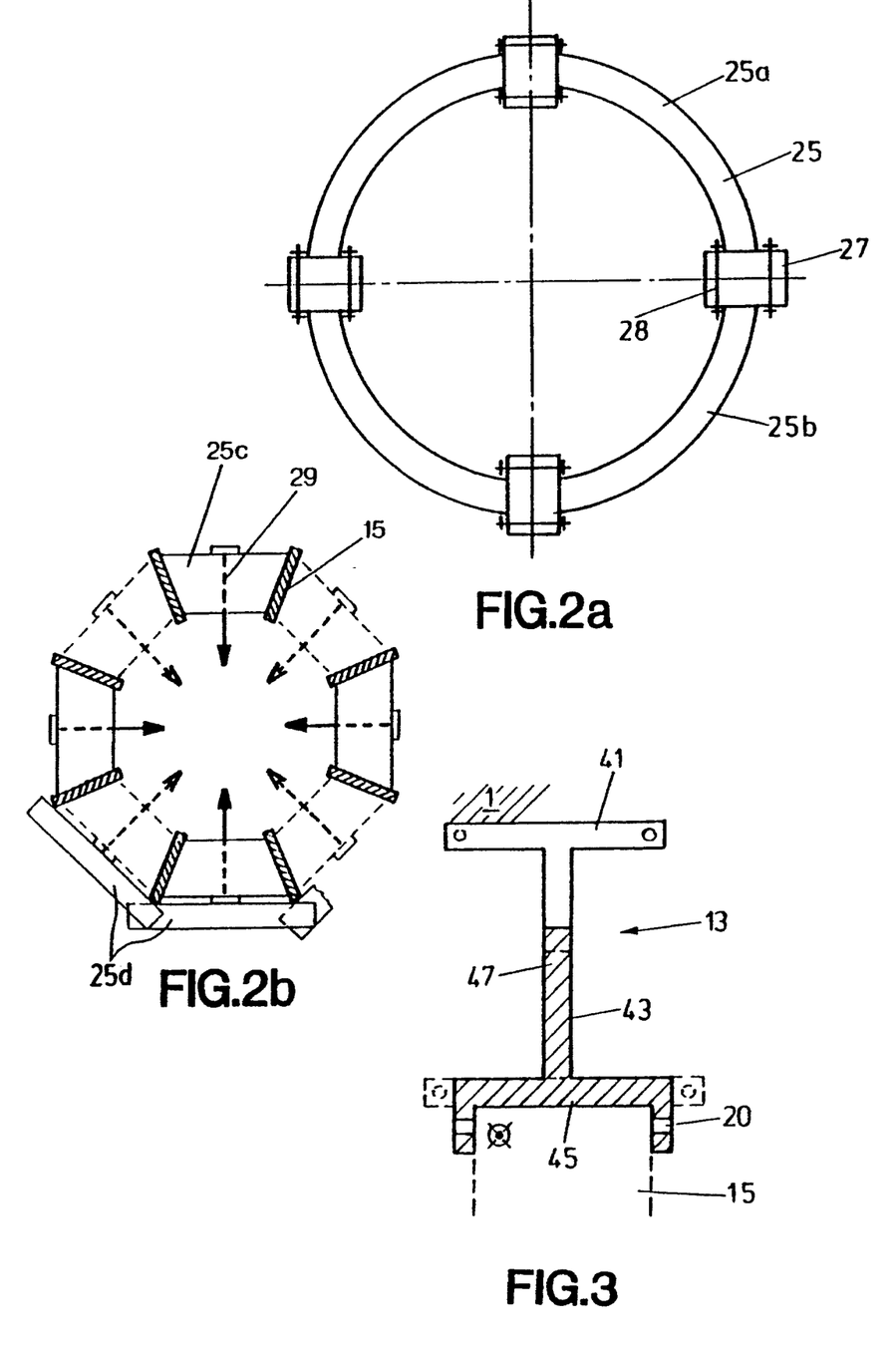
FIG. 2a is a schematic top view of an outer ring useful for explaining the azimuthal tensioning property of the outer ring system of FIG. 1.
FIG. 2b is an illustration analogue to FIG. 2a for radially tensionable outer support members.
FIG. 3 is an embodiment of a variant connecting angle between the body of the stator and the outer ring system of FIG. 1.

According to the schematic illustration in FIG. 2a, the outside ring 25 can be tensioned in azimuthal direction and according to a simple embodiment in accordance with said FIG. 2a, it consists of at least two, and preferably three or more, segments 25a, 25b, etc. of circular ring which are interconnected via the bracket plates 15 forming a portion of the outside ring by means of connectors 27. The segments are joined by azimuthally acting tightening screw bolts 28.

In certain cases the outside ring 25 may be replaced by a plurality of individual bracing bars resting at both of their ends, e.g., on bracket plates 15. Such individual bracing bars may be individually braced radially as by tie rods 29. It is also possible to provide a ring of such individual bracing bars 25c which are radially braced by tie rods 29 in accordance with FIG. 2b. In such a case, the bracing bars 25c must not necessarily form a closed ring, but some of them may be omitted such as illustrated by broken lines. The bracing bars can, as shown at 25d also rest on top of the bracket plates 15 and be axially staggered.

It shall be noted here distinctly that the end-winding can be structured in accordance with the invention and depending upon the demands of the machine as follows:
  Inside ring with tie rods and azimuthally braceable outer ring. Basic variant.
  Inside ring without tie rods, only with azimuthally braceable outer ring.
  Inside ring with outside ring of bracing bars which cannot be braced azimuthally. Bracing bars and inside ring are radially braced by tie rods.
  In each variant the inside ring is axially braced to the winding bars.
  The inside ring can be made of a homogeneous piece or be assembled of pieces which are glued and/or bolted together.
  In the case of smaller generators, the long inside ring may be replaced by two smaller rings which are not connected together.

According to the basic variant illustrated in FIG. 1, the tie rods 29 extend between the winding bars, which are braced by means of tightening nuts at the one hand at the outside ring 25 and at the other hand at the inside ring 9. The tightening nuts may thereby be preferably sunk into the inside and/or outside ring. See inside ring 9 in FIG. 1.

In relation to a perpendicular direction relative to the conical surface of inside ring 9 the conical surface defined by the inner bars 7, the tie rods 29 are inclined towards the stator core 1 by an angle $\alpha$, such that the tie rods 29 exert a wedging inwards pulling action upon the inside ring 9. In certain embodiments the angle $\alpha$ is selected such that the tie rods 29 are also inclined in relation to a perpendicular direction relative to the cone surface defined by the bracket plates 15, and by the outer bars 5 so that the outside ring 25 and the bracket plates 15 are braced outwards in a wedge-like fashion. The axial inwards bracing force on the inner ring 9 is marked in FIG. 1 schematically by $K_9$ and the outwards bracing force on the bracket plates 15 by $K_{15}$.

In accordance with the illustration, the bracket plates 15 transmit the forces produced by the tie rods 29 preferably via two or more rings 31, further via filler and/or padding pieces 40 arranged uniformly upon the outer bars 5, further via one or more rings 33, to the inner bars 7 which abut the inside ring 9 along practically the entire extent which is bent outwards. Paddings 35 and filler and/or padding pieces 40 are provided between the bracket plates 15, the encircling rings 31 and the outer bars 5 and also between the ring 33 and the inner and outer bars 5 and 7, respectively. Further padding pieces 37 are provided between the conical outer surface 12 of the inside ring 9 and the inner bars 7. Inserts 39 are located between the inner and the outer bars 5 and 7, respectively.

The bracket plates 15 and the tie rods 29 with the tightening nuts consist preferably of an electrically non-conducting material or, especially the latter, of insulating, electrically poorly conducting steel.

When performing maintenance or repair of the stator end-winding system with a stator core 1 and cone-like outwardly bent bars of the winding analogous to the illustration of FIG. 1, the actual state of the original winding is analyzed by a modal analysis with regard to its resonance behavior. Thereafter the original means provided for anchoring the bars at the stator end winding system are completely or partially removed. If necessary, new or modified connecting members similar to angle members 13 are mounted onto the stator core 1, if necessary the bracket plates 15 are replaced or the original connectors and/or bracket plates are used again. Prior to this, the rings 31, 33 are equipped with the corresponding padding. Thereafter, the segmented outside ring 25 is assembled over the bracket plates 15, the inserts 39 are padded, placed as an intermediate layer between the outer and inner bars 5, 7 and these bars are then supported further by filling material and cords.

Thereafter, the inside ring 9 inclusive of the padding pieces 37 are inserted and the tie-rods 29 are mounted. Then, all paddings, padding pieces 37 inclusive or exclusive, are impregnated with a setting resin which is allowed to set and thereafter the end-winding is braced, by means of the tie rods 29 and the azimuthal tightening screw bolts 28 at the outside ring 25. Finally, the outside ring 25 and the inside ring 9 are locked by means of not illustrated cords or filling pieces placed against the winding, and the resonance behavior of the stator is checked by means of a control modal-analysis and if necessary changed by adjusting the bracing.

Due to the fact that the inside ring is braced axially by means of the tie rods and especially due to the large surface contact acting upon the outer and inner bars, an extraordinarily stiff and rigid structure having resonance frequencies which are substantially above the possible exciting frequencies occurring during normal operation is realized in spite of the fact that the disclosed stator end-winding system can be easily disassembled.

In FIG. 1, a preferred embodiment of the connectors, namely, of angle members 13 is illustrated. FIG. 3 illustrates a section through one such angle member. The angle member 13 includes an upper laterally extending anchor beam 41 which, when mounted, extends azimuthally and is bolted to the stator core 1. Beam 41 acts in the axial direction as a leaf spring. A connecting plate 43 arranged to form a T with anchor beam 41, visible in FIG. 1, connects the beam 41 to anchor plate 45 having substantially the shape of a "U", which latter, according to FIG. 1, is bolted to a respective bracket plate 15. The connecting plate 43 can be provided with a recess 47 (see also FIG. 1).

According to a further variation of the embodiment, it is also possible to maintain existing supporting angles as angle members 13 which existing angles are mounted to the stator core 1 via pressure springs so that additionally, due to the action of such pressure springs, the necessary axial movability between the braced array of the bars of the winding and the stator core 1 is enabled.

A simple possibility for absorbing thermally caused expansion of the bars relative to the stator core 1 is to support the bolts 19 (FIG. 1) in the corresponding bores 20 in the angle members 13 and/or in the bracket plates 15 in rubber elastic sleeves which resiliently absorb the mentioned axial displacements and at the same time guide the bracket plates 15 azimuthally in the U-shaped anchor plates 45 as longitudinal guides, but remain azimuthally stiff.

The bracket plates 15 can also be supported so as to be freely slidable in the U-shaped anchor plates 45 acting as guides; in such cases no screw bolts 19 need be provided. Further in this case, the plates 15 may be advantageously shaped with outer surfaces 23 parallel to axis A.

This means that then the lower surface of anchor plate 45 of angle members 13 is parallel to the axis A. Angle members 13 may be made of non-magnetic material, especially of stainless steel or of fibre glass or of a combination of both.

Figure 4:
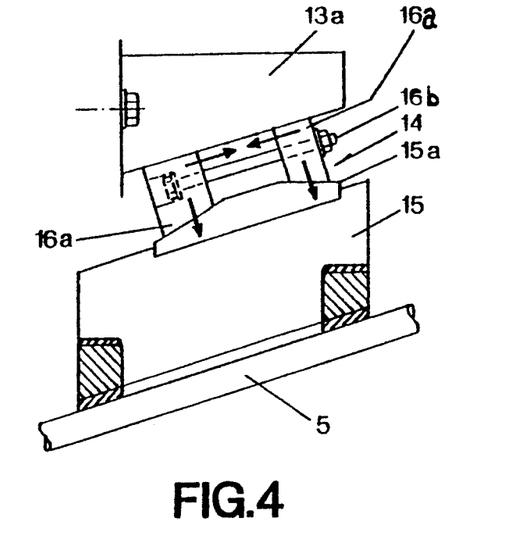
FIG. 4 is a partial view of a further embodiment of the inventive end-winding system.

FIG. 4 illustrates a portion of a further embodiment of the inventive stator end-winding system, namely, without outside ring 25 (see FIG. 2a) and without tie-rods 29 (see FIG. 1). In this embodiment, a modified angle member 13a is mounted via screw bolts to the not illustrated stator core 1. A bracket plate 15 is allocated to every angle member 13a which includes a transmitter member 15a. A bracing system 14 is provided at the angle member 13a which may be a spring system or as illustrated a wedge system which braces the bracket plate 15 against the outer bars 5. This illustrated bracing system absorbs axial changes of the dimensions of the bars without loss of its effectiveness. The illustrated embodiment includes two wedges 16a, which are driven by tensioning bolt 16b in opposite directions and which urge the bracket plate 15 radially inwards.

The angle member 13a may be a solid ring having an inner diameter sufficient to enable removal and/or replacement without disassembly of the array of bars 5, 7.

Figure 5:
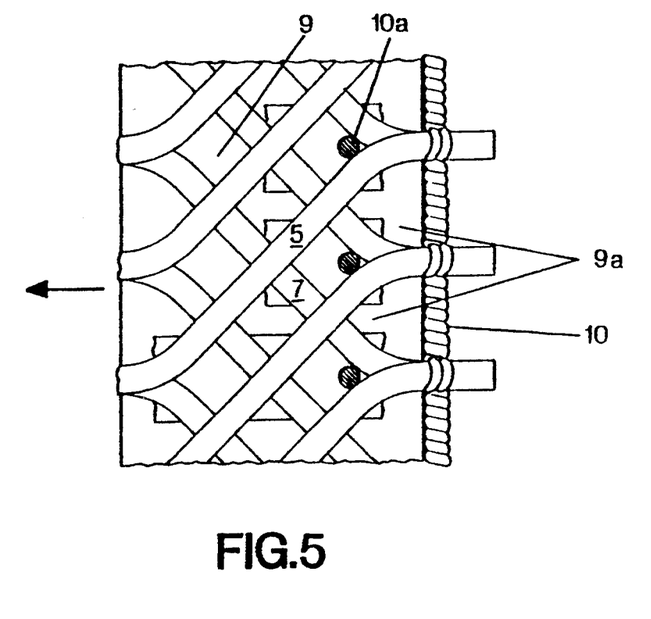
FIG. 5 is a partial view of a still further embodiment of the inventive end-winding system, preferably combined with the embodiment according to FIG. 4 or FIG. 1.

The illustration of a stator end-winding system in FIG. 5 discloses how the inside ring 9 can be axially braced in the shown direction and be arrested without connection to an outside supporting system such as formed by the outside ring 15 or bracing bars 25a, 25b, 25c or 25d. The inside ring 9 is thereby urged axially inwards and arrested by a cord system 10 which is rigidly arranged at the bars 5, 7 and/or by safety pins 10a which are inserted in slide bars 9a which pins 10a claw into the bars.

Preferably, the two embodiments according to FIGS. 4 and 5 may be combined.

For the axial bracing of the inside ring 9, it is possible to provide wedge and/or spring systems acting in an axial direction upon the inside ring instead of using the measures according to FIG. 5.

While there are shown and described present preferred embodiments of the invention, it is to be distinctly understood that the invention is not limited thereto, but may be otherwise variously embodied and practiced within the scope of the following claims.

What is claimed is:

1. An end-winding system of a stator of an electric machine having a hollow conical-shaped array of bars arranged coaxially about an axis of the machine and expanding outwardly at its end areas to define said hollow conical shape and having a support means including an inside ring having a conical-shaped outer surface extending along a predominant axial portion of an inner surface of said conical-shaped array of bars to provide an inner supporting surface area for said bars of a length at least equal to a length of said predominant axial portion, said support means including means urging said inside ring in an axial direction to urge said conical-shaped outer surface firmly against said array of bars which expands in a manner to define said hollow conical-shape; and an outer support system engaging an outer surface of said array of bars and being removable and replaceable without the need to disassemble said array of bars, coupling means for urging said outer support system towards the conical surface of said inside ring for clamping said array of bars between said outer support system and said inside ring, and resilient means arranged between said outer support system and said stator to enable a common axial displacement of said array of bars, said outside support system and said inside ring against a retaining force of said resilient means, said inside ring urging said outside support system against said resilient means through means coupling said outside ring to said inside ring.

2. The end-winding system of claim 1, said outer support system including at least one segmented ring surrounding said array of bars.

3. The end-winding system of claim 2, said segmented ring including tensioning means extending substantially in an azimuthal direction between respective segments of said segmented ring.

4. The system of claim 2, where in said segmented ring is radially urged towards said inside ring by tensioning means.

5. The system of claim 1, wherein said coupling means further comprise tensioning means for urging said outside support system towards said inside ring, said tensioning means extending in a substantially radial direction between said outside support system and said inside ring.

6. The stator end-winding system of claim 1, wherein said outer support system includes at least one outside ring and wherein said coupling means further comprises tie rod means coupled to said one outside ring to urge said outer support system towards said inside ring, said tie rod means including azimuthally tensionable tie rods.

7. The system of claim 1, wherein said outer support system defines a conical surface acting upon said outer surface of said array of bars.

8. The system of claim 1, wherein said inside ring comprises at least two cone-shaped sections arranged axially in an end-to-end relation.

9. The system of claim 1, wherein said outer support system is mounted to said stator by connectors being substantially stiffer in a radial and in an azimuthal direction than in an axial direction.

10. The system of claim 1, wherein said outer support system is mounted to said stator by connectors having spring members applying an axial force to said outer support system.

11. The system of claim 1, wherein said outer support system is mounted to said stator by means which comprise connectors having slidable brace members cooperating with wedge shaped members for adjusting a force applied by the outer support system to said array of bars.

12. The system of claim 1, wherein the bars of said array, said inside ring and said outer support system are padded.

13. The system of claim 1, further comprising cords bracing said bars of said array near an outer end thereof for maintaining the bars in a given position.

14. The system of claim 1, wherein a central portion of said inside ring is provided with a gas guiding channel to guide a cooling gas flow axially into said electric machine.

15. The system of claim 1, wherein said outer support system comprises at least one continuous outside ring providing a conical-shaped surface for supporting said array of bars.

16. The system of claim 15, wherein said continuous outside ring is made of one piece and has an inner diameter larger than a maximum diameter of said conical-shaped array of bars.

17. An end-winding system of a stator of an electric machine having a hollow conical-shaped array of bars expanding coaxially about an axis of the machine at its end areas to define said hollow conical shape and having a support means including an inside ring having a conical-shaped outer surface extending along a predominant axial portion of an inner surface of said conical-shaped array of bars to provide an inner supporting surface area for said bars coextensive with the predominant axial portion of the inner surface of said array of bars, said support means further including means urging said inside ring in an axial direction to urge said conical-shaped outer surface firmly against said array of bars which expands in a manner to define a hollow conical-shape; and an outer support system engaging an outer surface of said array of bars and being removable and replaceable without a need to disassemble said array of bars, coupling means urging said outer support system towards said inside ring for clamping said array of bars between said outer support system and said inside ring, and resilient means urging said outer support system toward said array and enabling a common axial displacement of said array, said outer support system and said inside ring said outer support system including adjustable sliding wedge means coupled between said stator and said bars of said array and slidable along stationary wedge means engaging said array of bars along a substantial longitudinal portion thereof for adjusting a force applied by said stationary wedge means towards said inside ring.

18. The system of claim 17 wherein said adjustable sliding wedge means further comprises wedge members slidable along said outer support system and being urged toward one another to cause said outer support system to be urged toward said bars.

19. An end-winding system of a stator of an electric machine having a hollow conical-shaped array of bars expanding coaxially about an axis of the machine at its end areas to define said hollow conical shape and having a support means including an inside ring having a conical-shaped outer surface extending along a predominant axial portion of an inner surface of said conical-shaped array of bars to provide an inner supporting surface area for said bars, coextensive with the inner surface along said predominant axial portion, said means urging said inside ring in an axial direction to urge its conical-shaped outer surface firmly against said array of bars which expands in a manner to define said hollow conical-shape; and an outer support system engaging an outer surface of said array of bars and being removable and replaceable without a need to disassemble said array of bars, coupling means urging said outer support system towards said inside ring for clamping said array of bars between said outer support system and said inside ring, and resilient means urging said array toward said inside ring and enabling a common axial displacement of said array, said outer support system and said inside ring, said outer support system including means, fixed to said stator and plural adjustable wedge means positioned between said means fixed to said stator and said bars of said array and engaging a substantial longitudinal portion thereof for adjusting a force of said outer support system towards said inside ring, said resilient means being arranged between said adjustable wedge means and said coupling means for urging said array of bars towards said inner ring.

20. An end-winding system of a stator of an electric machine having a hollow conical-shaped array of bars expanding coaxially about an axis of the machine at its end areas to define said hollow conical-shape array of bars and having a support means including an inside ring having a conical-shaped outer surface extending along a predominant axial portion of an inner surface of said conical-shaped array of bars to provide an inner supporting surface area for said bars, coextensive with the inner surface along said predominant axial portion, means urging said inside ring in an axial direction to urge said conical-shaped outer surface firmly against said array of bars which expands in a manner to define a hollow conical-shaped array of bars; and an outer support system engaging an outer surface of said array of bars and being removable and replaceable without a need to disassemble said array of bars, coupling means urging said outer support system towards said inside ring for clamping said array of bars between said outer support system and said inside ring, and spring means urging said outer support system toward said inner ring and enabling a common axial displacement of said array, said outer support system and said inside ring, said outer support system comprising mounting means fixed to said stator and coupling means arranged between said mounting means and said array of bars, said coupling means including outer support means engaging a substantial longitudinal portion of said bars and wedge means slidable relative to said mounting means and said outer support means to support the array of bars in cooperation with said inside ring, at least one of said mounting means and said coupling means providing a spring force substantially in an axial direction.

21. A retrofitting set for a stator end-winding support system of an electric machine having a stator, said system having a stator end-winding comprising a hollow conical-shaped array of bars expanding outwards coaxially about an axis of the machine and forming said hollow conical-shaped array of bars having inner and outer conical-shaped surfaces, said set comprising an inside ring having a conical-shape outer surface of an extent conforming to at least a predominant portion of the inner conical-shaped surface of said array of bars to provide a surface area supporting said array of bars and coextensive with said predominant portion of the inner conical surface; an outer support system surrounding the outer conical-shaped surface of said array of barb and bracing means including resilient means for normally axially urging said outer support system with a spring force towards the stator of said machine and means for urging said outer support system towards said inside ring whereby said resilient means resiliently urges said outside ring and said inside ring towards said stator of said machine, said retrofitting set being installable and removable to and from said stator end-winding support system without removing the stator end-winding.

* * * * *